US010283780B2

(12) United States Patent
Allen et al.

(10) Patent No.: US 10,283,780 B2
(45) Date of Patent: May 7, 2019

(54) ELECTRODE FOR ELECTROCHEMICAL CELLS AND COMPOSITION THEREOF

(71) Applicant: INDUSTRIE DE NORA S.P.A., Milan (IT)

(72) Inventors: Christopher J. Allen, Concord, OH (US); Sobha Abraham, Concord, OH (US); Kenneth L. Hardee, Concord, OH (US)

(73) Assignee: INDUSTRIE DE NORA S.P.A., Milan (IT)

( * ) Notice: Subject to any disclaimer, the term of this patent is extended or adjusted under 35 U.S.C. 154(b) by 78 days.

(21) Appl. No.: 15/527,357

(22) PCT Filed: Dec. 17, 2015

(86) PCT No.: PCT/EP2015/080355
§ 371 (c)(1),
(2) Date: May 17, 2017

(87) PCT Pub. No.: WO2016/097217
PCT Pub. Date: Jun. 23, 2016

(65) Prior Publication Data
US 2018/0040903 A1 Feb. 8, 2018

Related U.S. Application Data

(60) Provisional application No. 62/094,206, filed on Dec. 19, 2014.

(51) Int. Cl.
| | |
|---|---|
| *H01M 4/86* | (2006.01) |
| *H01M 4/88* | (2006.01) |
| *H01M 4/92* | (2006.01) |
| *H01M 4/18* | (2006.01) |
| *C25B 11/04* | (2006.01) |
| *H01M 8/18* | (2006.01) |
| *H01M 8/20* | (2006.01) |
| *C25B 1/24* | (2006.01) |

(52) U.S. Cl.
CPC ............ *H01M 4/8615* (2013.01); *C25B 1/24* (2013.01); *C25B 11/0484* (2013.01); *C25B 11/0494* (2013.01); *H01M 4/8652* (2013.01); *H01M 4/8882* (2013.01); *H01M 4/921* (2013.01); *H01M 4/923* (2013.01); *H01M 8/184* (2013.01); *H01M 8/188* (2013.01); *H01M 8/20* (2013.01); *H01M 2300/0002* (2013.01); *Y02E 60/528* (2013.01)

(58) Field of Classification Search
CPC combination set(s) only.
See application file for complete search history.

(56) References Cited

U.S. PATENT DOCUMENTS

| | | | |
|---|---|---|---|
| 3,954,502 A | 5/1976 | Symons et al. | |
| 3,982,960 A * | 9/1976 | Hoekje | H01M 4/00 429/199 |
| 4,540,639 A | 9/1985 | Grimes | |
| 5,281,496 A | 1/1994 | Clarke | |
| 2003/0068544 A1* | 4/2003 | Cisar | C25B 1/06 429/524 |
| 2003/0143443 A1 | 7/2003 | Tsang et al. | |
| 2004/0126631 A1 | 7/2004 | Uchida et al. | |
| 2005/0075240 A1* | 4/2005 | Yamamoto | H01M 4/921 502/101 |
| 2005/0211569 A1 | 9/2005 | Botte et al. | |
| 2007/0160897 A1* | 7/2007 | He | B01J 23/002 429/483 |
| 2007/0161501 A1* | 7/2007 | Chien | H01M 4/921 502/101 |
| 2007/0259251 A1* | 11/2007 | He | C22C 5/04 429/483 |
| 2010/0316931 A1* | 12/2010 | Wieland | H01M 4/8605 429/492 |
| 2011/0024294 A1* | 2/2011 | Jeng | B82Y 30/00 204/471 |
| 2011/0127169 A1* | 6/2011 | Ouweltjes | H01M 4/9025 205/334 |
| 2014/0186742 A1* | 7/2014 | Yi | H01M 4/8652 429/482 |

FOREIGN PATENT DOCUMENTS

DE 2658852 A1 6/1978

OTHER PUBLICATIONS

International Search Report and Written Opinion for International Application No. PCT/EP2015/080355 (13 Pages) (dated Feb. 10, 2016).
International Preliminary Report on Patentability for International Application No. PCT/EP2015/080355 (12 Pages) (dated Feb. 24, 2017).

* cited by examiner

*Primary Examiner* — Kaity V Chandler
(74) *Attorney, Agent, or Firm* — Lucas & Mercanti, LLP

(57) ABSTRACT

An electrode for use in an electrochemical cell, especially a zinc-bromine flow battery or a hydrogen/bromine flow battery, and methods for manufacturing and using the electrode is provided. The electrode has a metal substrate and a catalytic coating applied onto the substrate wherein the catalytic coating has a Ru-rich mixture of ruthenium and having 70-80 mol % Ru, 1-5 mol % Pt and 17-25 mol % Ir. The catalytic coating composition exhibits a surprisingly high voltage efficiency and operating lifetime despite its relatively low Ir/Ru and Pt/Ru ratios. The underlying metal substrate is for example a porous Ti layer or a layer with titanium suboxides $Ti_xO_y$.

12 Claims, No Drawings

ELECTRODE FOR ELECTROCHEMICAL CELLS AND COMPOSITION THEREOF

This application is a U.S. national stage of PCT/EP2015/080355 filed on Dec. 17, 2015 which claims the benefit of priority from U.S. Provisional Patent Application No. 62/094,206 filed on Dec. 19, 2014 the contents of each of which are incorporated herein by reference.

FIELD OF THE INVENTION

The present invention relates to an electrode for electrochemical cells and systems to be used, for example, in rechargeable batteries for energy storage.

BACKGROUND OF THE INVENTION

Electrochemical cells and systems, for instance rechargeable batteries and fuel cells, play a crucial role in a variety of applications such as energy storage, conversion and management; in particular they can be employed to address grid stability issues in conjunction with both renewable and nonrenewable energy sources.

Among rechargeable batteries, flow batteries represent a particularly advantageous solution for the applications above because of their limited costs, high efficiency, modularity, and easy transportability.

Flow batteries usually comprise a plurality of electrochemical cells and provide energy storage via one or more electroactive compounds dissolved into liquid electrolytes. In zinc bromine flow batteries, for example, an aqueous solution of zinc bromide is stored into two tanks and can be circulated through the system. During the charge cycle of the battery, metallic zinc is electroplated from the electrolyte solution at the surface of the negative electrode, while bromine is formed at the positive electrode. On discharge the reverse process occurs: bromine is reduced to bromide while the metallic zinc dissolves back into the solution, where it remains available for the next charge cycle of the battery.

Advantageously, zinc bromine flow batteries can be left completely and indefinitely discharged without damage; they have no practical shelf life limitations, and provide high cell voltage and energy density compared to other types of flow batteries.

The growing interest in the electrochemical cells and systems described above translates into ongoing efforts aimed at optimizing these devices in terms of cost, efficiency and life-time, and also with respect to their potential impact in connection with environmental and health and safety issues.

In this respect, the optimization of the electrodes where the electrochemical reaction occurs is key in improving the overall performance of the systems that implement them. A parameter that can be usefully employed to assess the efficiency of rechargeable electrochemical cells is the voltage efficiency, defined as the ratio between the average discharge voltage and the average charge voltage of the cell, expressed in percentage. The voltage efficiency is therefore a function of the energy required by the system for charging during storage operations, on one side, and of the energy released by the system during discharge, on the other. The higher the voltage efficiency of the cell, the more convenient it is in terms of operating costs and energetic performance.

In a zinc bromine battery, it is possible to achieve and maintain voltage efficiency above 66% using a metal electrode coated with a catalytic composition comprising high molar percentages of one or both iridium and platinum, for example 70% and 23% respectively along with other catalytic metals. Since platinum is believed to foster the bromine reduction reaction, it is not surprising that a coating with relatively high platinum content should exhibit satisfactory performances in terms of voltage efficiency, as it favorably impacts on the energy of the discharge process of the cell.

However, both iridium and platinum are particularly expensive materials and their price greatly impacts on the production costs of the electrodes.

Furthermore, hazards of occupational exposure to select platinum containing compounds include respiratory and skin ailments that require stringent exposure limits and/or limit the daily manufacturing capacity of a production facility. In the field of catalytic converters for use in conversion of automotive pollutants, platinum is typically the abundant noble metal in the catalyst formulation. Therefore a low yet effective platinum concentrated coating, which boosts performance for the bromine redox reaction in zinc bromine flow batteries, for example, and limits platinum exposure and associated ailments during handling, is an added benefit.

Additionally, any battery or electrolysis process that employs metal plating/de-plating on an electrode surface (such as a Zn-halogen battery) benefits from low levels of metallic impurities. Such impurities incorporated into the electrochemical process can lead to non-uniform metal plating, growth of metal dendrites and shortened cell life. Metal contaminated electrolyte can stem from dissolution of mixed metal oxide-coated substrate, which has shown to be particularly prevalent in the case of certain platinum containing coatings. For example, early investigations into Pt—Ir (70:30 wt % ratio) mixed metal oxide coatings for electrowinning revealed preferential platinum dissolution over iridium (D. Wensley and H. Warren, "*Progressive Degradation of Noble Metal Coated Titanium Anodes in Sulfuric Acid and Acidic Copper Sulfate Electrolytes*", Hydrometallurgy, 1 (1976), pp. 259-276.; D. Wensley and I. H. Warren, "Corrosion and Passivation Behavior of Noble Metal Coated Anodes in Copper Electrowinning Applications," Metall. Trans. 6. 1OB (1979), pp. 50S511). Mixed metal oxide corrosion can also be accelerated by organic additives. Organic complexing agents are often introduced in electrolytes containing bromine in order to control the solubility of this volatile component. Maintaining low yet effective weight ratios of platinum in the mixed metal oxide matrix minimizes potential risks related to the release of platinum impurities in the electrolyte. This is beneficial to a battery system that is expected to require little to no maintenance over its lifetime and provide consistent performance for more than 10 years.

Therefore, the parameters that should be taken into account in the design of electrodes for electrochemical cells, for instance in energy storage applications, are both those defining the performance of the electrode (such as the voltage efficiency, current density, stability and lifetime) and those impacting on costs and safety issues (such as the costs of the raw materials constituting the electrode, and the costs related to the management and disposal of possible hazardous materials employed in the fabrication process). All these parameters affect the overall economics of the system and should be globally optimized.

It is therefore desirable to produce an electrode for electrochemical cells provided with a suitable catalytic coating composition that allows achieving high voltage efficiencies, possibly above 70% and preferably above 73%, and good stability for operating lifetimes above 10 years. Such catalytic coating composition should also minimize the costs of the raw materials and the amount of hazardous substances employed for its preparation, without compromising, and possibly enhancing, the efficiency and duration of the electrode.

SUMMARY OF THE INVENTION

Various aspects of the invention are set out in the appended claims.

Under one aspect, the present invention relates to an electrode for use in electrochemical cells comprising a metal substrate and a catalytic coating applied onto the substrate. The catalytic coating comprises a mixture of noble metals or noble metal oxides according to the following composition: 60-85% ruthenium, 0-25% iridium and 1-15% platinum, the amounts being expressed in mole percentage referred to the elements, and adding up to 100%.

Hence, in the absence of iridium, the coating composition is expressed as 85% ruthenium, 15% platinum, in mole percentage referred to the elements. In one embodiment, the catalytic coating according to the invention comprises a mixture of noble metals or noble metal oxides according to the following composition: 60-85% ruthenium, 1-25% iridium and 1-15% platinum.

The catalytic coating can be applied onto the metal substrate either directly over the metal surface or over one or more interlayers of different composition, loading and thickness with respect to the catalytic coating. The coating may be applied using any known appropriate application method such as, for example, brush, roller, electroplate, dipping, gravure, spraying methods or chemical or physical vapor deposition.

The inventors observed that the claimed catalytic coating, despite its relatively low Ir/Ru and Pt/Ru ratios, exhibits surprisingly high voltage efficiencies, typically above 70%, when the catalytically coated electrode is used in electrochemical cells such as rechargeable batteries. Such coating composition may be advantageous in terms of the costs of raw materials because of the relatively low iridium and platinum content. Furthermore, a composition containing platinum in amounts equal or less than 15% (in mole percentage) can provide the advantage of reducing platinum dissolution problems which could lead to the contamination of the electrolyte. It can also provide the advantage of reducing the hazard of occupational exposure to platinum containing precursor compounds used in the manufacturing process of the coating composition. In one embodiment, the loading of ruthenium, iridium and platinum of the catalytic coating is chosen to be 5 to 30 g/m$^2$ referred to elements. This range ensures that the electrode delivers the required performances in terms of voltage efficiency, in particular when used in connection with flow batteries for energy storage applications, such as zinc bromine flow batteries, while keeping the total amount of platinum and iridium relatively low.

Under one embodiment, the catalytic coating comprises a mixture of noble metals or noble metal oxides consisting of 70-80% ruthenium, 17-25% iridium and 1-5% platinum expressed in mole percentage referred to the elements. The electrode with such coating composition surprisingly exhibits further improved voltage efficiencies, above 73%, and can be particularly convenient in terms of cost, stability and lifetime. Additionally, the particularly low platinum content can be advantageous in reducing platinum dissolution problems and the hazard of occupational exposure.

Under another embodiment, the metal substrate of the electrode is made of a titanium material. The titanium material may be crystalline, amorphous or contain crystallites; it may be compact or porous. Titanium based electrodes can exhibit advantages in relation to the capability of the material to resist within chemically aggressive environments, its good conduction properties and mechanical stability, and finally because it can be easily worked into a variety of shapes, such as nets, sheets, tubes and wires.

Under another embodiment, the metal substrate of the electrode is porous and exhibits an average porosity of 40 to 60%, wherein by average porosity it is meant the fraction of the volume of voids over the total volume of the material expressed in percentage. The specified values are measured using the single point Brunauer, Emmett and Teller (BET) method. The claimed porosity can have the advantage of providing an increased surface area and decreased current density at the electrode surface, which results in improved cell voltage. Furthermore, the porosity of the metal substrate may render the material permeable to at least one of the electrolytic solutions circulating within the electrochemical cell. This feature may be advantageously exploited in membrane-less systems, in particular in membrane-less flow batteries, such as membrane-less zinc bromine flow batteries.

Between the catalytic coating and the titanium based substrate of a porous electrode, it may prove beneficial to interpose one or more interlayers comprising titanium. This can have the advantage of inhibiting wetting of the coating and to control its distribution through the electrode cross-section during deposition. Depending on the flow configuration of the cell, isolating the coating concentration on the electrode surface nearest the reaction area can help maximize catalyst exposure and in turn minimize loading requirements As a cost and performance effective alternative to porous titanium, the metal substrate of the electrode may comprise titanium suboxides. These $Ti_xO_y$ phases where x and y are typically in the range of 2-10 and 3-19 respectively, offer inherent cost and production advantage. They can be produced via reduction of commodity precursors like titania with reasonable energy input and they also offer improved stability and corrosion resistance in low pH chloride and bromide containing electrolytes such as typically found at a flow battery electrode surface. Specific to the bromine reaction, the selected suboxides also offer catalytic benefits relative to traditional titanium.

Under another aspect, the present invention relates to a method for the production of the electrode as hereinbefore described. The method comprises the following sequential steps: first, a precursor solution containing a mixture of ruthenium, platinum, and optionally iridium compounds is applied in one or more coats onto the metal substrate; second, the metal substrate is dried after each coating at a temperature of 80° C. to 150° C.; finally, the dried metal substrate is thermally treated at a temperature of 350° C. to 600° C. The precursor solution may be applied onto the metal substrate, in 3 to 8 coatings, either directly onto the substrate or onto one or more intermediate layers deposited onto the metal substrate.

Under another aspect, the present invention is related to a process for energy storage that makes use of at least one electrochemical cell containing a zinc bromide electrolytic solution and equipped with at least one electrode according to the present invention. In correspondence of said electrode, during the charge and discharge cycle of the electrochemical cell, the reversible $Br_2 + 2e^- \leftrightarrows 2Br^-$ reaction takes place. The charge and discharge process of the electrochemical cell may be executed in periodic cycles by means of an external electric circuit connected to the cell. During such periodic cycles, in the elementary electrochemical cell, the alternate evolution/reduction of bromine takes place at the electrode of the present invention whereas the periodic plating/deplating of zinc occurs at a second electrode contained within the cell.

Under another aspect, the present invention concerns a flow battery comprising at least one electrode according to the present invention. Advantageously, the flow battery can be a zinc bromine, a hydrogen/bromine or an organic redox species/bromine flow battery and the electrode can be used for the alternate evolution/reduction of bromine. The flow batteries according to the invention can be profitably employed in energy storage applications because of their improved voltage efficiency, power density, stability and lifetime. The attention to the kind and amounts of materials used in the composition of the catalytic coating of the electrode, or electrodes, employed in the claimed flow battery may further provide added benefits in terms of reducing the costs of the electrode and minimizing occupational hazard risks.

Under another aspect, the electrode as hereinbefore described may be employed for the electrolysis of brominated electrolytes towards the production of bromine as a commodity chemical.

The following examples are included to demonstrate particular embodiments of the invention, whose practicability has been largely verified in the claimed range of values. It should be appreciated by those of skill in the art that the compositions and techniques disclosed in the examples which follow represent compositions and techniques discovered by the inventors to function well in the practice of the invention; however, those of skill in the art should, in light of the present disclosure, appreciate that many changes can be made in the specific embodiments which are disclosed and still obtain a like or similar result without departing from the scope of the invention.

EXAMPLE 1

A coating solution was prepared by dissolving the following compounds in 17 ml of 0.1 M HCl and 1 ml of t-octylphenoxypolyethoxyethanol solution, commercialized by Dow Chemicals under the trade name Triton® X-100:
0.641 g $RuCl_3.xH_2O$;
0.395 g $H_2IrCl_6.xH_2O$;
0.038 g $H_2PtCl_6.xH_2O$.

This solution was coated by brush onto a 2.0 mm thick porous titanium substrate (4 $cm^2$ shadow area), with average pore volume equal to 50%, mounted in a titanium sheet frame. The sample was dried at 110° C. for 10 minutes and then baked at 470° C. for 10 minutes. A total of three coats were applied to provide a coating of $RuO_2$, $IrO_2$ and Pt with a nominal composition of 75% Ru, 23% Ir and 2% Pt by mole percentage. The coated sample was placed in an electrochemical cell opposite a titanium sheet electrode. An electrolyte composed of $ZnBr_2$, $ZnCl_2$, $Br_2$ and Methyl Ethyl Pyrrolidinium Bromide (MEP) was circulated through the cell with a pump. The electrolyte was maintained at a temperature of 40-45° C. A current of 200 mA was applied to the cell for 10 minutes to evolve bromine and plate zinc on the Ti sheet electrode. The cell was then placed at open circuit for 30 seconds and then discharged at 532 mA until the zinc was fully removed. The cell voltage was monitored during the test. The measured voltage efficiency was 79%. The short term stability has been assessed by performing 50 charge/discharge cycles and monitoring the cell voltage; after each run the voltage efficiency remained above 99.0% of the initial efficiency. The long term stability has been assessed by performing 5000 charge/discharge cycles and monitoring the cell voltage; the voltage efficiency has shown to remain above 95.0% of the initial efficiency during the whole experiment.

EXAMPLE 2

A coating solution is prepared by dissolving the following compounds in 17 ml of 0.1 M HCl and 1 ml of octylphenoxypolyethoxyethanol solution, commercialized by Dow Chemicals under the trade name Triton® X-100:
0.7815 g $RuCl_3.xH_2O$;
0.30489 g $H_2PtCl_6.xH_2O$ This solution was coated by brush onto a 2.0 mm thick porous titanium substrate (4 $cm^2$ shadow area) mounted in a titanium sheet frame. The sample was dried at 110° C. for 10 minutes and then baked at 470° C. for 10 minutes. A total of four coats were applied to provide a coating of $RuO_2$ and Pt with a nominal composition of 85% Ru and 15% Pt in mole percentage referred to the elements. The coated sample was placed in an electrochemical cell opposite a titanium sheet electrode. An electrolytic solution composed of $ZnBr_2$, $ZnCl_2$, $Br_2$ with MEP complexing agent was circulated through the cell with a pump. The electrolyte was maintained at a temperature of 40-45° C. A current of 200 mA was applied to the cell for 10 minutes to evolve bromine and plate zinc on the titanium sheet electrode. The cell was then placed at open circuit for 30 seconds and then discharged at 532 mA until the zinc was fully removed. The cell voltage is monitored during the test. The resulting voltage efficiency was found to be 78.5%. The short term stability has been assessed by performing 50 charge/discharge cycles and monitoring the cell voltage; after each run the voltage efficiency was found to be above 99.0% of the initial efficiency. The long term stability was assessed by performing 4500 charge/discharge cycles and monitoring the cell voltage; the voltage efficiency remained above 95.0% of the initial voltage efficiency during the whole experiment.

COUNTER EXAMPLE 1

A coating solution was prepared by dissolving the following compounds in 17 ml of 0.1 M HCl and 1 ml of octylphenoxypolyethoxyethanol solution, commercialized by Dow Chemicals under the trade name Triton® X-100:
$RuCl_3$: 0.641195 g
$H_2IrCl_6$: 0.429062 g This solution was coated by brush onto a 2.0 mm thick porous titanium substrate (4 $cm^2$ shadow area) mounted in a titanium sheet frame. The sample was dried at 110° C. for 10 minutes and then baked at 470° C. for 10 minutes. A total of four coats were applied to provide a coating of $RuO_2$ and Pt with a nominal composition of 75% Ru and 25% Ir in mole percentage referred to the elements. The coated sample was placed in an electrochemical cell opposite a titanium sheet electrode. An electrolytic solution composed of $ZnBr_2$, $ZnCl_2$, $Br_2$ with MEP complexing agent was circulated through the cell with a pump. The electrolyte was maintained at a temperature of 40-45° C. A current of 200 mA was applied to the cell for 10 minutes to evolve bromine and plate zinc on the titanium sheet electrode. The cell was then placed at open circuit for 30 seconds and then discharged at 532 mA until the zinc was fully removed. The cell voltage is monitored during the test. The resulting voltage efficiency was found to be 71%. The short term stability has been assessed by performing 50 charge/discharge cycles and monitoring the cell voltage; after each run the voltage efficiency was found to be above 99.0% of the initial efficiency. The long term stability was assessed by performing 4500 charge/discharge cycles and monitoring the cell voltage; the voltage efficiency remained above 95.0% of the initial voltage efficiency during the whole experiment.

The previous description shall not be intended as limiting the invention, which may be used according to different embodiments without departing from the scopes thereof, and whose extent is solely defined by the appended claims.

Throughout the description and claims of the present application, the term "comprise" and variations thereof such as "comprising" and "comprises" are not intended to exclude the presence of other elements, components or additional process steps.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

The invention claimed is:

1. Electrode for use in electrochemical cells comprising:
   a metal substrate; and
   a catalytic coating comprising a mixture of noble metals or oxides thereof, wherein said mixture comprises 70-80% ruthenium, 17-25% iridium and 1-5% platinum in mole percentage referred to the elements.

2. The electrode according to claim 1, wherein the loading of ruthenium, iridium and platinum is 5 to 30 g/m$^2$ referred to the sum of the elements.

3. The electrode according to claim 1, wherein said metal substrate consists of a titanium material.

4. The electrode according to claim 3 further comprising an intermediate layer containing titanium material applied between said metal substrate and said catalytic coating.

5. The electrode according to claim 4, wherein said titanium material comprises titanium suboxides according to the formula $Ti_xO_y$, wherein x is in the range of 2 to 10 and y is in the range of 3 to 19.

6. The electrode according to claim 1, wherein said substrate has an average porosity of 40% to 60%.

7. Method for the production of an electrode according to claim 1 comprising the following sequential steps:
   applying a precursor solution comprising a mixture of ruthenium, iridium and platinum compounds in one or more coats over said metal substrate;
   drying said metal substrate after each coating at a temperature of 80° C. to 150° C.; and
   thermally treating said dried metal substrate at a temperature of 350° C. to 600° C.

8. The method according to claim 7, wherein the precursor solution is applied to said metal substrate in 3 to 8 coats.

9. Process for energy storage comprising the following steps:
   circulating a zinc bromide solution within at least one electrochemical cell; and
   performing the electrolysis of said solution within said electrochemical cell;
   said electrochemical cell being equipped with at least one electrode comprising a metal substrate and a catalytic coating comprising a mixture of noble metals or oxides thereof, wherein said mixture comprises 60-85% ruthenium, 0-25% iridium and 1-15% platinum in mole percentage referred to the elements, wherein said electrode alternately evolves and reduces bromine.

10. The process according to claim 9 further comprising the execution of a periodic electric charge and discharge cycle on said electrochemical cell by means of an external electric circuit.

11. Flow battery comprising at least one electrode according to claim 1.

12. Flow battery comprising at least one electrode which alternately evolves and reduces bromine comprising a metal substrate and a catalytic coating comprising a mixture of noble metals or oxides thereof, wherein said mixture comprises 60-85% ruthenium, 0-25% iridium and 1-15% platinum in mole percentage referred to the elements, wherein said flow battery is a zinc/bromine flow battery, a hydrogen/bromine flow battery or an organic redox species/bromine flow battery.

* * * * *